United States Patent
Linenberg et al.

[11] Patent Number: 6,112,731
[45] Date of Patent: Sep. 5, 2000

[54] ENGINE DIAGNOSTIC METHOD

[75] Inventors: Mark Thomas Linenberg, Dearborn; Patrick Joseph Curran, Farmington Hills; Steven Victor Przesmitzki, Gibraltar, all of Mich.

[73] Assignee: Ford Global Technologies, Inc., Dearborn, Mich.

[21] Appl. No.: 09/217,300

[22] Filed: Dec. 21, 1998

[51] Int. Cl.[7] .................................................. F02D 41/00
[52] U.S. Cl. ........................... 123/690; 60/274; 60/276; 60/277; 73/23.32; 73/23.31
[58] Field of Search ................... 123/690, 691; 60/276, 277, 274; 73/23.32, 23.31

[56] References Cited

U.S. PATENT DOCUMENTS

| | | |
|---|---|---|
| 4,170,201 | 10/1979 | Camp et al. . |
| 4,170,969 | 10/1979 | Asano . |
| 4,445,326 | 5/1984 | Lyon . |
| 4,638,658 | 1/1987 | Otobe . |
| 4,928,518 | 5/1990 | Tamura . |
| 5,070,847 | 12/1991 | Akiyama et al. ........................ 123/489 |
| 5,163,316 | 11/1992 | Toyoda et al. . |
| 5,213,088 | 5/1993 | Harada ................... 123/690 |
| 5,579,747 | 12/1996 | Sato et al. ................ 123/690 |

FOREIGN PATENT DOCUMENTS

| | | | |
|---|---|---|---|
| 0291745 | 12/1986 | Japan ..................................... 123/691 |
| 0038657 | 2/1988 | Japan ..................................... 123/690 |
| 0314344 | 12/1988 | Japan ..................................... 123/690 |
| 406042382A | 2/1994 | Japan . |

*Primary Examiner*—Thomas Denion
*Assistant Examiner*—Diem Tran
*Attorney, Agent, or Firm*—Allan J. Lippa

[57] ABSTRACT

An engine diagnostic method for an engine having a switching exhaust gas sensor and a fuel system uses the switching exhaust gas sensor during open loop fuel enrichment to diagnose fuel system degradation, including fuel filter degradation.

20 Claims, 4 Drawing Sheets

ENGINE DIAGNOSTIC METHOD

FIELD OF THE INVENTION

The invention relates to diagnosing fuel system degradation of an internal combustion engine, and in particular diagnosing degraded fuel filters.

BACKGROUND OF THE INVENTION

Engine fuel systems typically use a fuel filter to remove contaminants from the fuel before the fuel is injected into the engine. After some operating time, these filters can become oversaturated with contaminants and limit the fuel supplied to the engine. During normal operating conditions, enough fuel may be supplied to the engine to operate at a desired air/fuel ratio. However, at certain operating conditions, such as, for example, high speed and high load wide open throttle conditions, there may be a lack of fuel to operate at the desired air/fuel ratio. In this example the desired air/fuel ratio is rich of stoichiometry. During such conditions, there may be a lack of fuel that will degrade engine performance due to excessively lean air/fuel ratio operation.

One method of learning fueling system degradation is to use information provided from closed loop air/fuel ratio control. In such a system, feedback from exhaust gas oxygen sensors located downstream of the engine allow the air/fuel ratio controller to keep the air/fuel ratio at stoichiometry. In addition, a relationship between a fueling command and expected fuel flow rate is known. Thus, during closed loop operation, it is possible to diagnose degradation of the fuel system by comparing the closed loop correction from the exhaust gas sensors to an open loop estimate based on the known relationship. The open loop estimate of fuel flow deviation is provided by an experimentally determined relationship between a pulse width command from the engine controller and mass flow rate of fuel. Such a system is disclosed in U.S. Pat. No. 4,638,658.

The inventors herein have recognized a disadvantage with the above approach. For example, during wide open throttle conditions, which are the only conditions in which to detect certain degradation as described previously herein, the desired air/fuel ratio is enriched and the air/fuel ratio is controlled in an open loop mode. The open loop mode is used because typically exhaust oxygen sensors which switch around stoichiometry are employed. Thus, the closed loop correction value is never learned during this mode of operation and the degradation is not detected.

SUMMARY OF THE INVENTION

An object of the invention claimed herein is to provide an engine diagnostic method for diagnosing fueling system degradation during open loop fueling operation.

The above object is achieved, and problems of prior approaches overcome, by a diagnostic method for an internal combustion engine having a plurality of cylinders and a switching exhaust gas sensor positioned in an engine exhaust. The method comprises the steps of delivering fuel to the engine by open loop air/fuel control wherein fuel is delivered in relation to inducted airflow independently of the exhaust gas sensor, sensing an air/fuel ratio lean of stoichiometry based on the exhaust gas sensor, and indicating a degradation when said sensed air/fuel ratio is lean of stoichiometry for at least a predetermined time.

When operating in an open loop mode, information from a switching exhaust gas sensor is typically disregarded. However, when operating in an open loop mode, this information makes it is possible to detect degradation even though the sensor is a switching exhaust gas sensor. For example, when the open loop fueling command is calculated to give an enriched air/fuel ratio and the switching exhaust sensor indicates the exhaust air/fuel ratio is lean, then degradation is detected.

An advantage of the present invention is the ability to more accurately determine fueling system degradation than heretofore possible.

An advantage of the present invention is the ability to determine fueling system degradation over a greater range of operation than heretofore possible.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
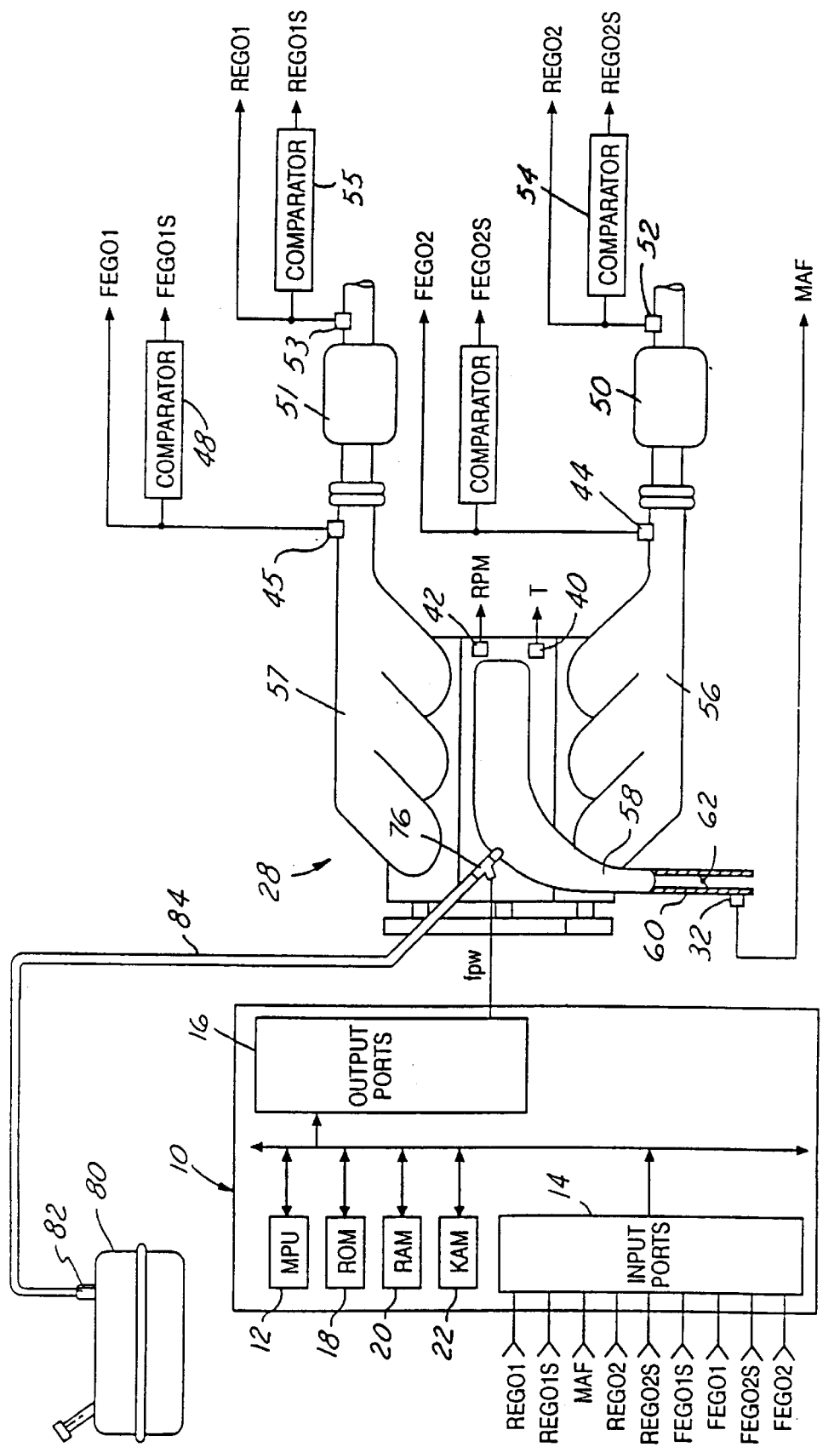
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18, for storing the control program; random access memory 20 for temporary data storage which may also be used for counters or timers; keep-alive memory 22, for storing learned values; and a conventional data bus.

Controller 10 is shown receiving various signals from sensors coupled to engine 28 including; measurement of inducted mass airflow (MAF) from mass airflow sensor 32; engine coolant temperature (T) from temperature sensor 40; and indication of engine speed (rpm) from tachometer 42. In this example, engine 28 is a V-type engine having first and second banks (not shown) coupled to respective first and second exhaust manifolds (57,56).

Output signal FEGO1 from conventional switching exhaust gas oxygen sensor 45, positioned upstream of first catalytic converter 51, is compared to a reference value associated with stoichiometry in comparator 48 for providing output signal FEGO1S. Signal FEGO1S is a two-state signal which is a predetermined high voltage when exhaust gases are rich of stoichiometry and a predetermined low voltage when exhaust gases are lean of stoichiometry. Both signal FEGO1 and signal FEGO1S are coupled to controller 10.

Output signal FEGO2 from conventional switching exhaust gas oxygen sensor 44, positioned upstream of second catalytic converter 50, is compared to a reference value associated with stoichiometry in comparator 46 for providing output signal FEG02S. Signal FEG02S is a two-state signal which is a predetermined high voltage when exhaust gases are rich of stoichiometry and a predetermined low voltage when exhaust gases are lean of stoichiometry. Both signal FEGO2 and signal FEGO2S are coupled to controller 10.

Another conventional switching exhaust gas oxygen sensor (53) is shown coupled to exhaust manifold 57 downstream of catalytic converter 51 and provides signal REGO1 to controller 10 which is related to oxygen content in the exhaust gases. Output signal REGO1 is also compared to a reference value associated with stoichiometry in comparator 55 for providing two-state output signal REGO1S to controller 10. Signal REGO1S is preselected high voltage when exhaust gases downstream of catalytic converter 51 are rich of stoichiometry and a low preselected voltage when such exhaust gases are lean of stoichiometry.

Yet another conventional switching exhaust gas oxygen sensor (52) is shown coupled to exhaust manifold 56 downstream of catalytic converter 50 and provides signal REGO2 to controller 10 which is related to oxygen content in the exhaust gases. Output signal REGO2 is also compared to a reference value associated with stoichiometry in comparator 54 for providing two-state output signal REGO2S to controller 10. Signal REGO2S is preselected high voltage when exhaust gases downstream of catalytic converter 50 are rich of stoichiometry and a low preselected voltage when such exhaust gases are lean of stoichiometry.

Continuing with FIG. 1, intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Figure 2:
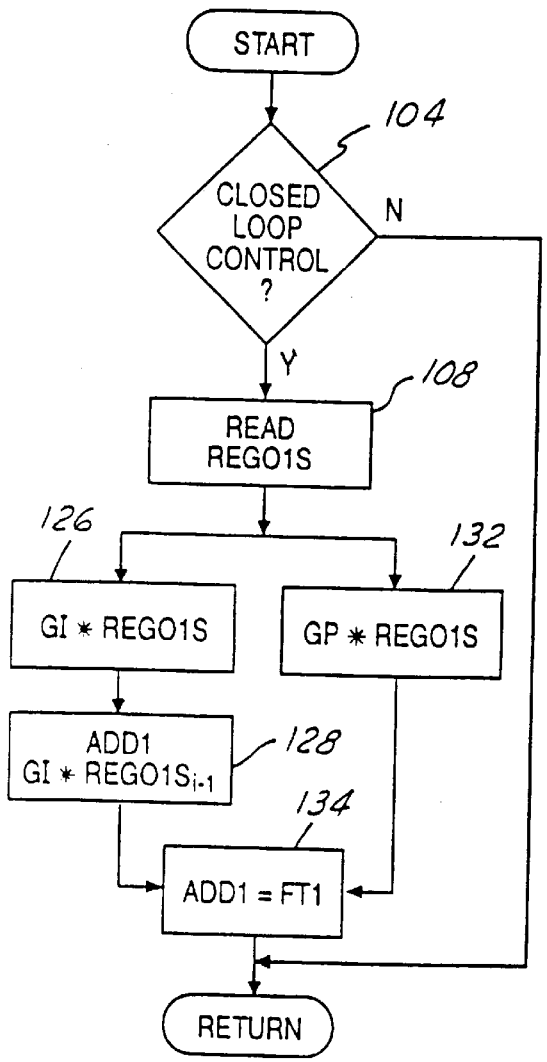
FIGS. 2–7 are high level flow charts of various operations performed by a portion of the embodiment shown in FIG. 1.

Referring now to FIG. 2, a flowchart of a routine performed by controller 10 to generate fuel trim signal FT1 for the first bank of engine 28 is now described. A determination is first made whether closed loop air/fuel control is to be commenced (step 104) by monitoring engine operation conditions such as temperature. When closed loop control commences, signal REGO1S is read from comparator 55 (step 108) and subsequently processed in a proportional plus integral controller as described below.

Referring first to step 126, signal REGO1S is multiplied by gain constant GI and the resulting product added to products previously accumulated (GI*REGO1S$_{i-1}$) in step 128. Stated another way, signal REGO1S is integrated each sample period (i) in steps determined by gain constant GI. During step 132, signal REGO1S is also multiplied by proportional gain GP. The integral value from step 128 is added to the proportional value from step 132 during addition step 134 to generate fuel trim signal FT1.

Figure 3:
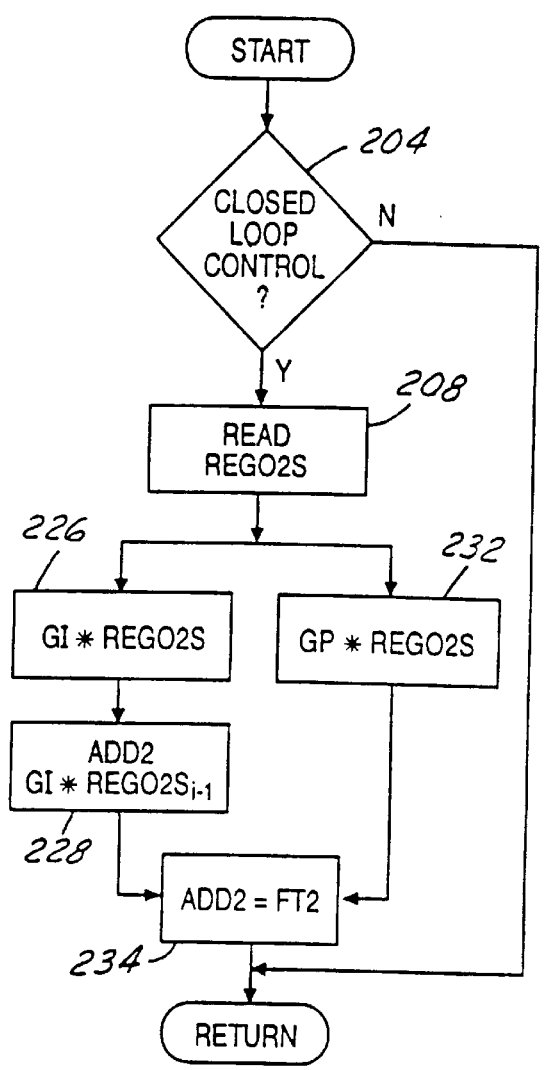

Referring now to FIG. 3, a flowchart of a routine performed by controller 10 to generate fuel trim signal FT2 for the second bank of engine 28 is now described. A determination is first made whether closed loop air/fuel control is to be commenced (step 204) by monitoring engine operation conditions such as temperature. When closed loop control commences, signal REGO2S is read from comparator 54 (step 208) and subsequently processed in a proportional plus integral controller as described below.

Referring first to step 226, signal REGO2S is multiplied by gain constant GI and the resulting product added to products previously accumulated (GI*REGO2S$_{i-1}$) in step 228. Stated another way, signal REGO2S is integrated each sample period (i) in steps determined by gain constant GI. During step 232, signal REGO2S is also multiplied by proportional gain GP. The integral value from step 228 is added to the proportional value from step 232 during addition step 234 to generate fuel trim signal FT2.

Figure 4:
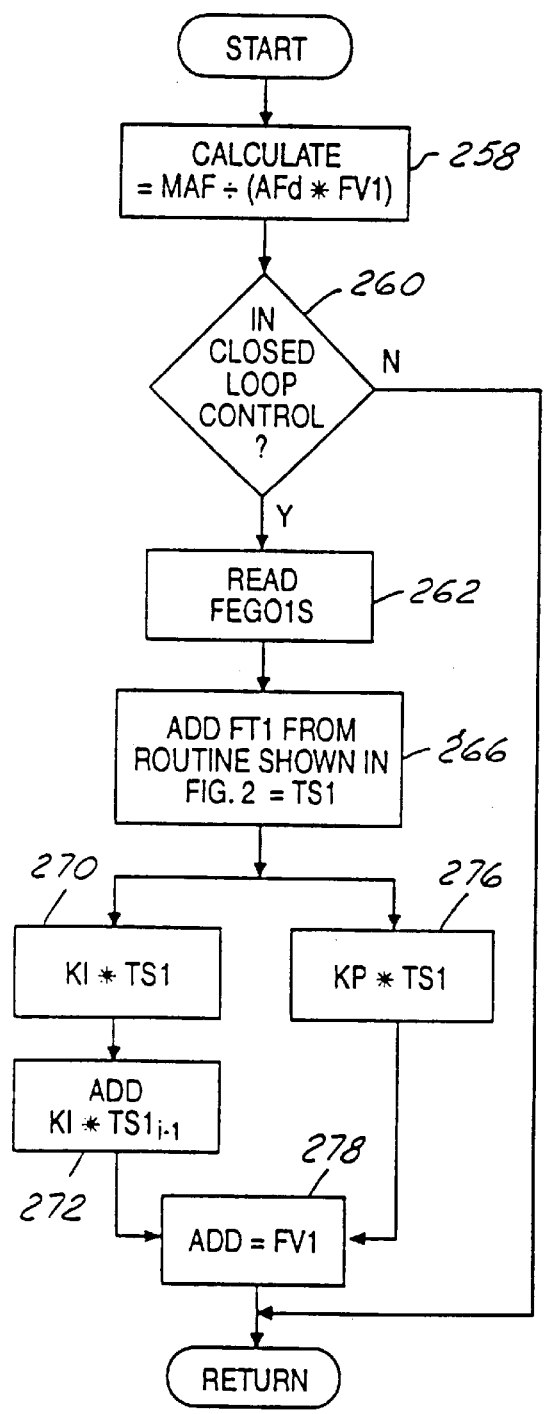

The routine executed by controller 10 to generate the desired quantity of liquid fuel delivered to the first bank of engine 28 and trimming this desired fuel quantity by a feedback variable related both to sensor 45 and fuel trim signal FT1 is now described with reference to FIG. 4. During step 258, an open loop fuel quantity is first determined by dividing measurement of inducted mass airflow (MAF) by desired air/fuel ratio AFd which is typically the stoichiometric value for gasoline combustion. This open loop fuel charge is then adjusted, in this example divided, by feedback variable FV1.

After determination that closed loop control is desired (step 260) by monitoring engine operating conditions such as temperature (T), signal FEGO1S is read during step 262. During step 266, fuel trim signal FT1 is transferred from the routine previously described with reference to FIG. 2 and added to signal FEGO1S to generate trim signal TS1.

During steps 270–278, a conventional proportional plus integral feedback routine is executed with trimmed signal TS1 as the input. Trim signal TS1 is first multiplied by integral gain value KI (step 270), and the resulting product added to the previously accumulated products (step 272). That is, trim signal TS1 is integrated in steps determined by gain constant KI each sample period (i) during step 272. A product of proportional gain KP times trimmed signal TS1 (step 276) is then added to the integration of KI*TS1 during step 278 to generate feedback variable FV1.

Figure 5:
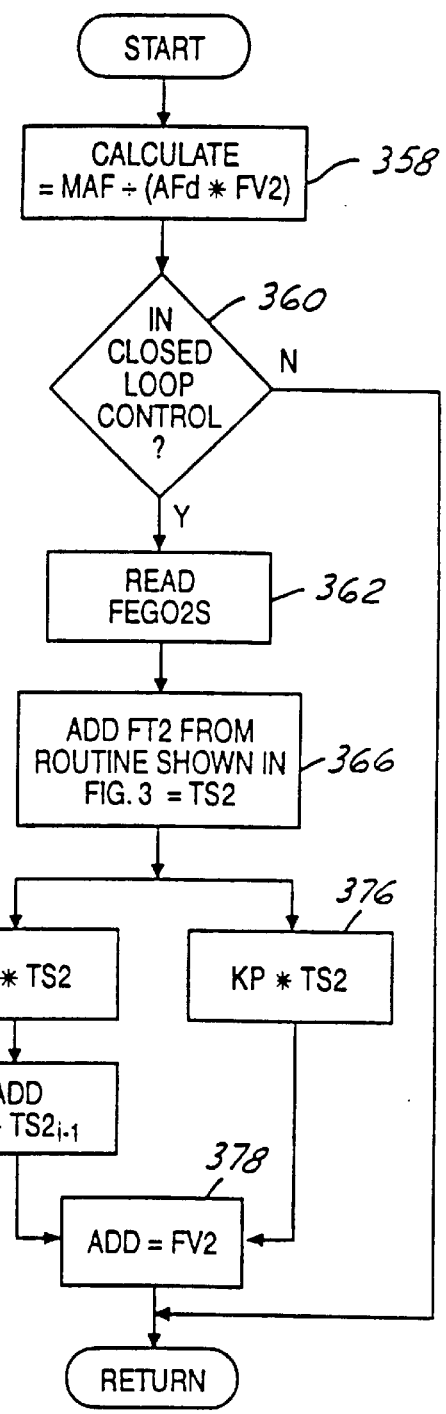

The routine executed by controller 10 to generate the desired quantity of liquid fuel delivered to the second bank of engine 28 and trimming this desired fuel quantity by a feedback variable related both to sensor 44 and fuel trim signal FT2 is now described with reference to FIG. 5. During step 358, an open loop fuel quantity is first determined by dividing measurement of inducted mass airflow (MAF) by desired air/fuel ratio AFd which is typically the stoichiometric value for gasoline combustion. This open loop fuel charge is then adjusted, in this example divided, by feedback variable FV2.

After determination that closed loop control is desired (step 360) by monitoring engine operating conditions such as temperature (T), signal FEGO2S is read during step 362. During step 366, fuel trim signal FT2 is transferred from the routine previously described with reference to FIG. 3 and added to signal FEGO2S to generate trim signal TS2.

During steps 370–378, a conventional proportional plus integral feedback routine is executed with trimmed signal TS2 as the input. Trim signal TS2 is first multiplied by integral gain value KI (step 370), and the resulting product added to the previously accumulated products (step 372). That is, trim signal TS2 is integrated in steps determined by gain constant KI each sample period (i) during step 372. A product of proportional gain KP times trimmed signal TS2 (step 376) is then added to the integration of KI*TS2 during step 378 to generate feedback variable FV2.

Figure 6:
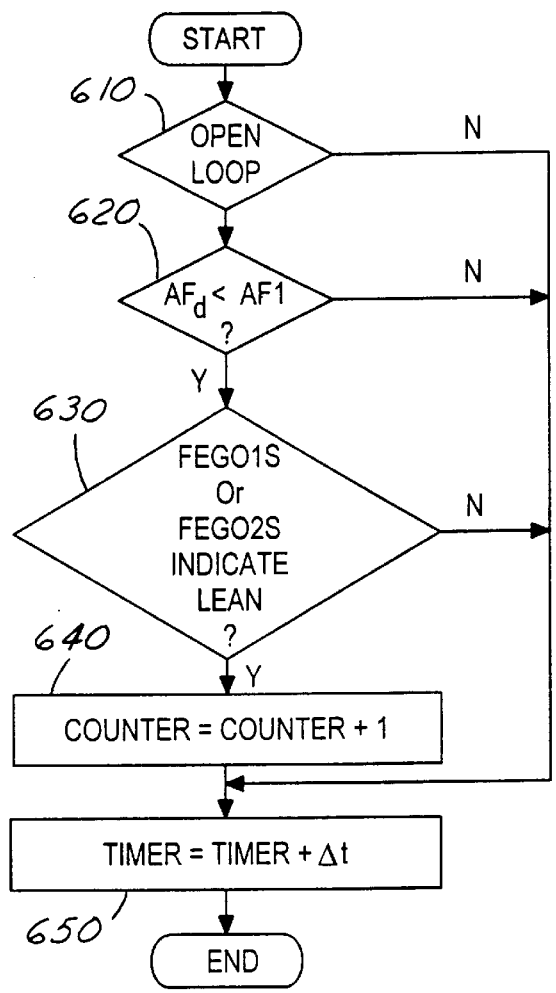

An example of determining the extent of fuel system degradation is now described with particular reference to the flowchart shown in FIG. 6. In step 610, a determination is made as to whether open loop air/fuel control operation is in progress. This may be due to several factors, such as, for example, power enrichment at wide open throttle conditions, catalytic converter protection, or many other situations that require an air/fuel ratio rich of stoichiometry. When operating in open loop air/fuel control, in step 620 a determination is made as to whether the desired air/fuel ratio (AFd) is less than (richer than) a predetermined rich air/fuel value (AF1). When the answer to step 620 is YES, a determination is made in step 630 as to whether either of the exhaust sensors (44, 45) indicate a lean condition. When either of the exhaust sensors (44, 45) indicate lean conditions, a counter is incremented in step 640. Then, in step 650, which follows step 640 or when the answer to step 620 is NO, the timer value is incremented by the time that elapsed since the last time this routine was executed (Δt).

In an alternative embodiment, a combination of any of the exhaust gas sensors (44, 45, 52, 53) is used to determine whether a lean condition is present. For example, when any two indicate a lean condition, the timer value is incremented. Alternatively, when two exhaust gas sensors on the same bank indicate a lean condition, the timer value is incremented.

When a single bank or inline engine is used and there are only two exhaust gas sensors, one before the converter and one after, an indication from either of the two sensors is used to determine if a lean condition exists. Alternatively, an indication from each of the two sensors is used to determine if a lean condition exists. In a another alternative embodiment, where only a single exhaust gas oxygen sensor is used, an indication from the single exhaust sensor is used to determine if a lean condition exists.

Figure 7:
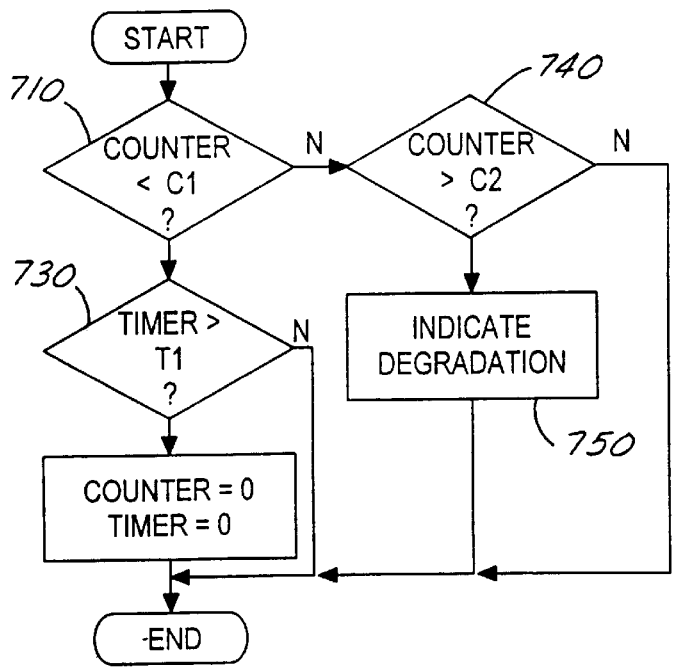

Referring now to FIG. 7, a routine for determining fuel system degradation is described. When counter value is less than first predetermined threshold C1 (step 710) and a timer value is greater than predetermined time T1 (step 720), both counter and timer are reset to zero in step 730. Otherwise, when counter value is not less than first predetermined threshold C1 (step 710) and is greater than second predetermined threshold C2 (step 740), degradation is indicated in step 750.

Thus, during open loop air/fuel control when a fuel injection quantity is calculated to give an air/fuel ratio rich of stoichiometry and switching exhaust gas sensors indicate a lean exhaust air/fuel ratio, fueling system degradation is indicated. Therefore, fuel system degradation can be determined during open loop air/fuel control.

Although several examples of embodiments which practice the invention have been described herein, there are numerous other examples which could also be described. For example, the invention may be used to advantage with carbureted engines, proportional exhaust gas oxygen sensors, and engines having an in-line configuration rather than a V-configuration. The invention is therefore to be defined only in accordance with the following claims.

We claim:

1. A diagnostic method for an internal combustion engine having a plurality of cylinders and a switching exhaust gas sensor positioned in an engine exhaust the method comprising the steps of:
   delivering fuel to the engine by open loop air/fuel control wherein fuel is delivered in relation to inducted airflow independently of the exhaust gas sensor;
   sensing an air/fuel ratio lean of stoichiometry based on the exhaust gas sensor; and
   indicating a degradation of said fuel delivery when said sensed air/fuel ratio is lean of stoichiometry for at least a predetermined time.

2. The method recited in claim 1 wherein said delivering step further comprises the step of delivering fuel to the engine during wide open throttle conditions.

3. The method recited in claim 1 wherein said delivering step further comprises the step of delivering fuel to the engine during catalyst protection conditions.

4. The method recited in claim 1 wherein said delivering step further comprises the step of delivering fuel to the engine by open loop air/fuel control wherein fuel is delivered in relation to inducted airflow, a desired open loop air/fuel ratio rich of stoichiometry, and independently of the exhaust gas sensor.

5. The method recited in claim 4 wherein said indicating step further comprises the step of indicating a degradation when said sensed air/fuel ratio is lean of stoichiometry for at least said predetermined time and said desired open loop air/fuel ratio is less than a predetermined value.

6. The method recited in claim 1 wherein the exhaust gas sensor is one of a plurality of switching exhaust gas sensors, wherein said sensing step further comprises the step of sensing an air/fuel ratio lean of stoichiometry based on a combination of more than one of the plurality of exhaust gas sensors.

7. The method recited in claim 6 wherein said sensing step further comprises the step of sensing an air/fuel ratio lean of stoichiometry based on a lean indication from each of the plurality of exhaust gas sensors.

8. The method recited in claim 7 wherein one of the plurality of exhaust gas sensors is located upstream of a catalytic converter and a second of the plurality of exhaust gas sensors is located downstream of said catalytic converter.

9. The method recited in claim 7 wherein one of the plurality of exhaust gas sensors is coupled to a first set of the plurality of cylinders and a second of the plurality of exhaust gas sensors is coupled to a second set of the plurality of cylinders.

10. A diagnostic method for an internal combustion engine having a plurality of cylinders and a switching exhaust gas sensor positioned in an engine exhaust, the method comprising the steps of:
    delivering fuel to the engine by open loop air/fuel control wherein fuel is delivered in relation to inducted airflow, a desired open loop air/fuel ratio rich of stoichiometry, and independently of the exhaust gas sensor;
    sensing an air/fuel ratio lean of stoichiometry based on the exhaust gas sensor; and
    indicating a degradation of said fuel delivery when said sensed air/fuel ratio is lean of stoichiometry for at least a predetermined time.

11. The method recited in claim 10 wherein said delivering step further comprises the step of delivering fuel to the during wide open throttle conditions.

12. The method recited in claim 10 wherein said delivering step further comprises the step of delivering fuel to the engine during catalyst protection conditions.

13. The method recited in claim 10 wherein said indicating step further comprises the step of indicating a degradation when said sensed air/fuel ratio is lean of stoichiometry for at least said predetermined time and said desired open loop air/fuel ratio is less than a predetermined value.

14. The method recited in claim 10 wherein the exhaust gas sensor is one of a plurality of switching exhaust gas sensors, wherein said sensing step further comprises the step of sensing an air/fuel ratio lean of stoichiometry based on a combination of more than one of the plurality of exhaust gas sensors.

15. The method recited in claim 14 wherein said sensing step further comprises the step of sensing an air/fuel ratio lean of stoichiometry based on a lean indication from each of the plurality of exhaust gas sensors.

16. The method recited in claim 15 wherein one of the plurality of exhaust gas sensors is located upstream of a catalytic converter and a second of the plurality of exhaust gas sensors is located downstream of said catalytic converter.

17. The method recited in claim 15 wherein one of the plurality exhaust gas sensors is coupled to a first set of the plurality of cylinders and a second of the plurality of exhaust gas sensors is coupled to a second set of the plurality of cylinders.

18. A diagnostic system for an internal combustion engine having a plurality of cylinders, the system comprising:

- a plurality of switching exhaust gas sensors positioned in an engine exhaust; and
- a controller for delivering fuel to the engine by open loop air/fuel control wherein fuel is delivered in relation to inducted airflow, a desired open loop air/fuel ratio rich of stoichiometry, and independently of each of the plurality of exhaust gas sensors, sensing an air/fuel ratio lean of stoichiometry based on a combination of the plurality of exhaust gas sensors, and indicating a degradation of said fuel delivery when said sensed air/fuel ratio is lean of stoichiometry for at least said predetermined time and said desired open loop air/fuel is less than a predetermined value.

19. The system recited in claim 18 wherein said controller further delivers fuel to the engine during wide open throttle conditions.

20. The system recited in claim 18 wherein said controller further delivers fuel to the engine during catalyst protection conditions.

* * * * *